US007532896B2

(12) United States Patent
Friday et al.

(10) Patent No.: US 7,532,896 B2
(45) Date of Patent: May 12, 2009

(54) WIRELESS NODE LOCATION MECHANISM USING ANTENNA PATTERN DIVERSITY TO ENHANCE ACCURACY OF LOCATION ESTIMATES

(75) Inventors: Robert J. Friday, Los Gatos, CA (US); Paul F. Dietrich, Seattle, WA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 11/751,456

(22) Filed: May 21, 2007

(65) Prior Publication Data

US 2007/0225039 A1 Sep. 27, 2007

(51) Int. Cl.
*H04W 24/00* (2009.01)
(52) U.S. Cl. ................... 455/456.1; 455/63.4
(58) Field of Classification Search ............... 455/63.4, 455/404.2, 423, 432.1, 436, 456.1–457, 561, 455/562.1, 67.11, 524–525; 342/357.01, 342/357.02, 359, 450, 457; 701/207, 213, 701/214, 216, 208; 343/702, 853, 882, 893
See application file for complete search history.

(56) References Cited

U.S. PATENT DOCUMENTS

| | | |
|---|---|---|
| 4,254,467 A | 3/1981 | Davis et al. |
| 5,028,848 A | 7/1991 | Bankston et al. |
| 5,063,371 A | 11/1991 | Oyer |
| 5,327,144 A | 7/1994 | Stilp et al. |
| 5,375,140 A | 12/1994 | Bustamante et al. |
| 5,394,158 A | 2/1995 | Chia |
| 5,396,582 A | 3/1995 | Kahkoska |
| 5,564,079 A | 10/1996 | Olsson |
| 5,570,412 A | 10/1996 | LeBlanc ................. 455/456.2 |
| 5,666,662 A | 9/1997 | Shibuya |
| 5,684,860 A | 11/1997 | Milani |
| 5,717,406 A | 2/1998 | Sanderford et al. ......... 342/457 |
| 5,732,354 A | 3/1998 | MacDonald |
| 5,945,948 A | 8/1999 | Buford et al. |
| 6,112,095 A | 8/2000 | Wax et al. |
| 6,115,605 A | 9/2000 | Siccardo et al. |
| 6,134,338 A | 10/2000 | Solberg et al. |
| 6,134,448 A | 10/2000 | Shoji et al. |

(Continued)

FOREIGN PATENT DOCUMENTS

EP 0 930 514 A2 7/1999

(Continued)

OTHER PUBLICATIONS

"Ekahau Logical Areas-location enabling the Wi-Fi network." Apr. 4, 2003. Ekahau, Inc., Saratoga, CA. Company's URL: www.ekahau.com.

(Continued)

*Primary Examiner*—Alexander Eisen
*Assistant Examiner*—Anthony S Addy
(74) *Attorney, Agent, or Firm*—Baker Botts L.L.P.

(57) ABSTRACT

A wireless node RF Fingerprinting location mechanism that uses multiple antenna patterns to enhance the accuracy of wireless node location in an RF environment. In one implementation, substantially non-overlapping antenna pattern diversity is used to provide a degree of sectorization in computing the estimated location of a wireless node.

16 Claims, 9 Drawing Sheets

U.S. PATENT DOCUMENTS

| | | | |
|---|---|---|---|
| 6,140,964 A | 10/2000 | Sugiura et al. | |
| 6,167,274 A | 12/2000 | Smith | |
| 6,198,935 B1 | 3/2001 | Saha et al. | |
| 6,212,391 B1 | 4/2001 | Saleh et al. | |
| 6,226,400 B1 | 5/2001 | Doll | |
| 6,236,365 B1 | 5/2001 | LeBlanc et al. | |
| 6,243,811 B1 | 6/2001 | Patel | |
| 6,249,252 B1 | 6/2001 | Dupray | |
| 6,269,246 B1 | 7/2001 | Rao et al. | |
| 6,272,541 B1 | 8/2001 | Cromer et al. | |
| 6,275,190 B1 | 8/2001 | Sugiura et al. | |
| 6,282,427 B1 | 8/2001 | Larsson et al. | |
| 6,304,218 B1 | 10/2001 | Sugiura et al. | |
| 6,317,599 B1 | 11/2001 | Rappaport et al. | |
| 6,317,604 B1 | 11/2001 | Kovach et al. | |
| 6,414,634 B1 | 7/2002 | Tekinay | |
| 6,415,155 B1 | 7/2002 | Koshima et al. | |
| 6,441,777 B1 | 8/2002 | McDonald | |
| 6,456,892 B1 | 9/2002 | Dara-Abrams et al. | |
| 6,526,283 B1 | 2/2003 | Jang | |
| 6,556,942 B1 | 4/2003 | Smith | |
| 6,581,000 B2 | 6/2003 | Hills et al. | |
| 6,664,925 B1 | 12/2003 | Moore et al. | |
| 6,674,403 B2 | 1/2004 | Gray et al. | 342/463 |
| 6,704,352 B1 | 3/2004 | Johnson | |
| 6,728,782 B1 | 4/2004 | D'Souza et al. | |
| 6,754,488 B1 | 6/2004 | Won et al. | |
| 6,760,318 B1 | 7/2004 | Bims | |
| 6,766,453 B1 | 7/2004 | Nessett et al. | |
| 6,771,609 B1 | 8/2004 | Gudat | |
| 6,788,658 B1 | 9/2004 | Bims | |
| 6,799,047 B1 | 9/2004 | Bahl et al. | 455/456.1 |
| 6,804,394 B1 | 10/2004 | Hsu | |
| 6,850,946 B1 | 2/2005 | Rappaport et al. | |
| 6,925,070 B2 | 8/2005 | Proctor | |
| 6,990,428 B1 | 1/2006 | Kaiser et al. | 702/150 |
| 7,123,924 B2 | 10/2006 | Cuffaro | |
| 2001/0016489 A1 | 8/2001 | Haymes et al. | |
| 2002/0036569 A1 | 3/2002 | Martin | |
| 2002/0045424 A1 | 4/2002 | Lee | 455/41 |
| 2002/0102988 A1 | 8/2002 | Myllymaki | |
| 2002/0115445 A1 | 8/2002 | Myllymaki | |
| 2002/0118118 A1 | 8/2002 | Myllymaki et al. | |
| 2002/0154134 A1 | 10/2002 | Matsui | |
| 2002/0168958 A1 | 11/2002 | Ford et al. | |
| 2002/0174335 A1 | 11/2002 | Zhang et al. | |
| 2002/0176366 A1 | 11/2002 | Ayyagari et al. | |
| 2002/0188723 A1 | 12/2002 | Choi | |
| 2003/0098811 A1 | 5/2003 | Nikolai | |
| 2003/0117985 A1 | 6/2003 | Fujii et al. | |
| 2003/0130987 A1 | 7/2003 | Edlund et al. | |
| 2003/0135486 A1 | 7/2003 | Edlund et al. | |
| 2003/0135762 A1 | 7/2003 | Macaulay | |
| 2003/0188006 A1 | 10/2003 | Bard | |
| 2003/0198208 A1 | 10/2003 | Koos | |
| 2004/0022214 A1 | 2/2004 | Goren et al. | |
| 2004/0029559 A1 | 2/2004 | McNew | |
| 2004/0066757 A1 | 4/2004 | Molteni et al. | 370/329 |
| 2004/0072577 A1 | 4/2004 | Myllymaki et al. | |
| 2004/0111397 A1 | 6/2004 | Chen et al. | |
| 2004/0151377 A1 | 8/2004 | Boose et al. | |
| 2004/0166878 A1 | 8/2004 | Erskine et al. | 455/456.1 |
| 2004/0176108 A1 | 9/2004 | Misikangas | |
| 2004/0186847 A1 | 9/2004 | Rappaport et al. | |
| 2004/0198373 A1 | 10/2004 | Ford et al. | |
| 2004/0198392 A1 | 10/2004 | Harvey et al. | 455/456.1 |
| 2004/0203910 A1 | 10/2004 | Hind et al. | 455/456.1 |
| 2004/0236547 A1 | 11/2004 | Rappaport et al. | |
| 2004/0259554 A1 | 12/2004 | Rappaport et al. | |
| 2004/0259555 A1 | 12/2004 | Rappaport et al. | |
| 2005/0068925 A1 | 3/2005 | Palm et al. | |
| 2005/0113090 A1 | 5/2005 | Sharony | |
| 2005/0128139 A1 | 6/2005 | Misikangas et al. | |
| 2005/0131635 A1 | 6/2005 | Myllymaki et al. | |
| 2005/0136944 A1 | 6/2005 | Misikangas et al. | |
| 2005/0185615 A1 | 8/2005 | Zegelin | 370/331 |
| 2005/0267677 A1* | 12/2005 | Poykko et al. | 701/207 |
| 2006/0071854 A1 | 4/2006 | Wilcox | |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 97/33386 | 9/1997 |
| WO | WO 98/41048 | 9/1998 |
| WO | WO 99/08909 | 2/1999 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau.com/pdf/EPE_2.0_datasheet.PDF.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Feb. 10, 2004. Wireless Valley, Austin, TX. URL: http://www.wirelessvalley.com/Assets/brochures/LanFielder.pdf.

Conley, C.. "Securing WLANS with Location-Enabled Networks." *Wireless Security Perspectives*, Vol. 5,No. 3.Mar. 2003. Organization's URL: www.cnp-wireless.com/wsp.html.

"Company Information." Apr. 6, 2004. Corsair Communications:A LightBridge Company, Burlington, MA. Company's URL: www.lightbridge.com.

"Corporate Fact Sheet." Aruba Wireless Networks, San Jose, CA. Feb. 10, 2004. URL: http://www.arubanetworks.com/pdf/corporate_fact_sheet.pdf.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"AeroScout WLAN Location System." Downloaded on Nov. 10, 2003 from http://www.bluesoft-inc.com/wlan.asp Bluesoft, Inc., San Mateo, CA.

"Cognio Announces Breakthrough Location Technology for WLAN Deployments." Downloaded on Nov. 10, 2003 from http://www.cognio.com/press_detail.asp?itemID=70 Cognio, Inc., Waltham, MA.

"WhereNet Main Page." Downloaded Nov. 10, 2003 from http://www.wherenet.com/ WhereNet, Santa Clara, CA.

Small, J., Smailagic, A., and Siewiorek, D.P. "Determining User Location For Context Aware Computing Through the Use of a Wireless LAN Infrastructure." Institute for Complex Engineered Systems. Carnegie-Mellon University, Pittsburgh, PA, 2000. Available at http://www-2.cs.cmu.edu/~aura/docdir/small00.pdf.

Kishan, A., Michael, M., Rihan, S., and R. Biswas. "Halibut: An Infrastructure for Wireless LAN Location-Based Services." Technical paper for Course CS444n, Computer Science Department, Stanford University, Stanford CA, Jun. 2001. Previously available at http://fern2.stanford.edu/cs44n/paper.pdf.

Bahl, P. and Padmanabhan, V.N. "Radar: An In-Building RF-based User Location and Tracking System." IEEE Infocom 2000, vol. 2, Mar. 2000, pp. 775-784.

"Positioning in Wireless Networks Reference." Downloaded on Jul. 28, 2005 from http://binary.engin.brown.edu/. Binary Group, Division of Engineering, Brown University, Providence, RI. Available online at http://binary.engin.brown.edu/publication/Positioning_Ref.pdf.

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online! URL: http://domino.research.ibm.com/comm/pr.nsf/pages/news.20020617_dwsa.html.

"Assessing Wireless Security with AiroPeek and AiroPeek NX." A WildPackets Academy Tutorial from www.wildpackets.com, WildPackets Inc., Walnut Creek, CA. Jan. 16, 2003. URL: http://www.wildpackets.com/elements/whitepapers/AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

"Location Determination Papers", List of publications maintained by Moustafa A. Youssef, Department of Computer Science, University of Maryland, College Park, MD 20742. Available online, and downloaded Feb. 9, 2006 at http://www.cs.umd.edu/~moustafa/location_papers.htm.

"Positioning in Wireless Networks Reference" Binary Group, Division of Engineering, Brown University, Providence, RI 02912, Available online, and downloaded Feb. 9, 2006 as binary.engin.brown.edu/publication/Positioning_Ref.pdf.

L.M. Ni, Y. Liu, Y.C. Lau and A.P. Patil. "LANDMARC: Indoor Location Sensing Using Active RFID." Proceedings of the First IEEE International Conference of Pervasive Computing and Communications 2003 (PerCom '03).

G. Wolfle, R. Wahl, P. Wertz, P. Wildbolz and F. Landstorfer. "Dominant Path Prediction Model for Indoor Scenarios." German Microwave Conference (GeMIC) 2005, Ulm (Germany), Apr. 2005 Paper.

P. Wertz, G. Wolfle, R. Hoppe, D. Zimmermann and F.M. Landstorfer. "Enhanced Localization Technique within Urban and Indoor Environments based on Accurate and Fast Propagation Models." European Wireless, 2002, Florence, Italy.

Steven Fortune, "Algorithms for prediction of indoor radio propagation", sjf@research.att.com, Jan. 7, 1998, Bell Laboratories, Murray Hill, New Jersey 07974.

A. Rajkumar, B.F. Naylor, F. Feisullin and L. Rogers, "Predicting RF Coverage in Large Environments using Ray-Beam Tracing and Partitioning Tree Represented Geometry", submitted to the ACM Journal of Wireless Networks after revision on Oct. 12, 1995, AT&T Bell Laboratories, Murray Hill, NJ 07974.

Reinaldo A. Valenzuela, Steven Fortune, and Jonathan Ling, "Indoor Propagation Prediction Accuracy and Speed Versus Number of Reflections in Image-Based 3-D Ray-Tracing", 1998, Bell Laboratories, Lucent Technologies, Holmdel, NJ 07733.

Bahl, P., Padmanabhan, V. and Balachandran, A. A Software System for Locating Mobile Users: Design, Evaluation and Lessons. Microsoft Research Technical Report MSR-TR-2000-12 [online], Apr. 2000 [retrieved on Jan. 1, 2006]. Retrieved from the Internet: < URL: http://research.microsoft.com/~padmanab/papers/radar.pdf>.

PCT Notification of Transmittal of The International Search Report and The Written Opinion of the International Searching Authority, or the Declaration (PCT Rule 44.1), dated Jan. 11, 2006, International Application No. PCT/USO5/06608).

1st Office Action from U.S. Appl. No. 10/802,366, the application which was filed Mar. 16, 2004, entitled "Location of Wireless Nodes Using Signal Strength Weighting Metric".

2nd Office Action from U.S. Appl. No. 10/802,366, the application which was filed Mar. 16, 2004, entitled "Location of Wireless Nodes Using Signal Strength Weighting Metric".

Office Action from U.S. Appl. No. 10/788,645, the application which was was filed Feb. 27, 2004, entitled "Selective Termination of Wireless Connections to Refresh Signal Information in Wireless Node Location Infrastructure".

Office Action from U.S. Appl. No. 10/794,842, the application which was filed Mar. 5, 2004, entitled "Selective Termination of Wireless Connections to Refresh Signal Information in Wireless Node Location Infrastructure".

Office Action from U.S. Appl. No. 10/848,276, the application which was filed May 18, 2004, entitled "Wireless Node Location Mechanism Featuring Definition of Search Region to Optimize Location Computation".

International Standard, ISO/IEC 8802-11 ANSI/IEEE Std. 802.11, 1999 Edition, Part II: Wirelss LAN Medium Access Control (MAC) and Physical Layer (PHY) specifications, pp. 122-137.

"tcp-masq" Internet citation http://speed.cis.nctu.edu.tw/bandwith/opensource/, Daa Sheet Cisco Aironet 1200 Series Access Point, pp. 1-13, posted Mar. 11, 2002.

* cited by examiner

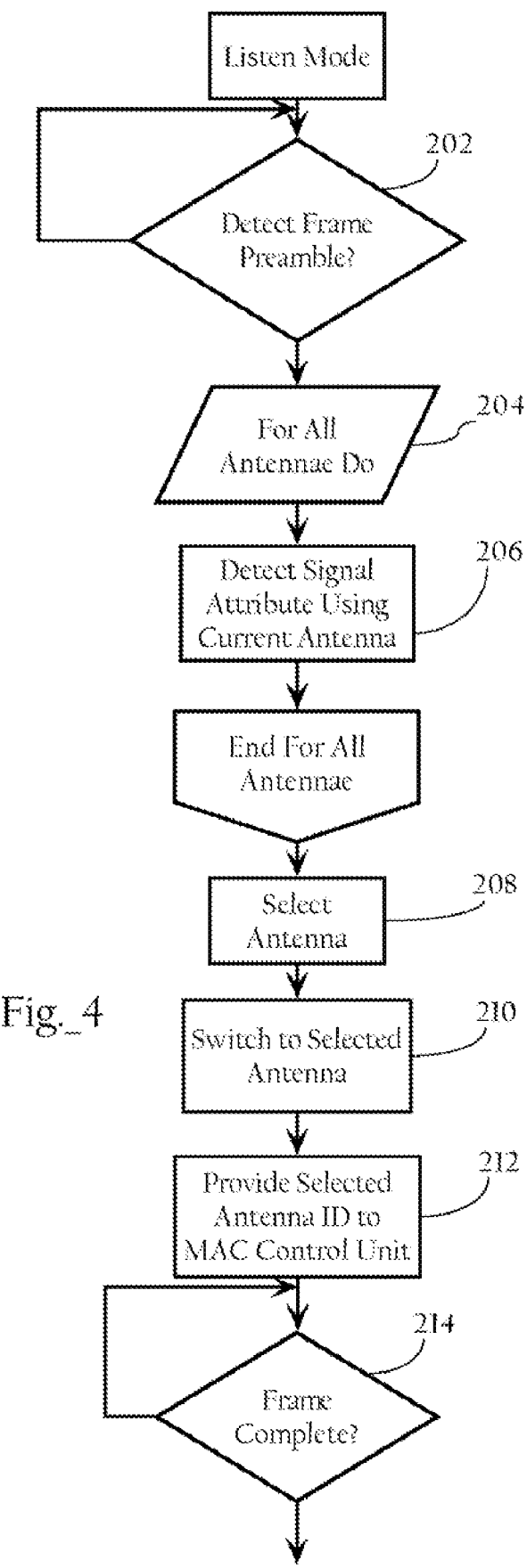
Fig._4
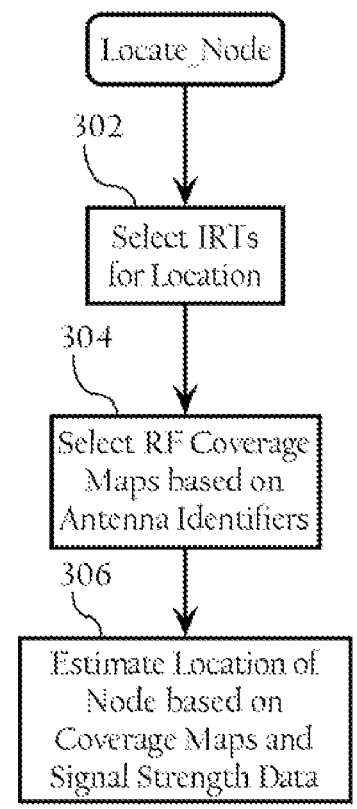
Fig._5

| IRT1, A1 | x1 | x2 | x3 | x4 | ... |
|---|---|---|---|---|---|
| y1 | ss(x1,y1) | ss(x2,y1) | ss(x3,y1) | ss(x4,y1) | ... |
| y2 | ss(x1,y2) | ss(x2,y2) | ss(x3,y2) | ss(x4,y2) | ... |
| y3 | ss(x1,y3) | ss(x2,y3) | ss(x3,y3) | ss(x4,y3) | ... |
| y4 | ss(x1,y4) | ss(x2,y4) | ss(x3,y4) | ss(x4,y4) | ... |
| ... | ... | ... | ... | ... | ... |

| IRT1, A2 | x1 | x2 | x3 | x4 | ... |
|---|---|---|---|---|---|
| y1 | ss(x1,y1) | ss(x2,y1) | ss(x3,y1) | ss(x4,y1) | ... |
| y2 | ss(x1,y2) | ss(x2,y2) | ss(x3,y2) | ss(x4,y2) | ... |
| y3 | ss(x1,y3) | ss(x2,y3) | ss(x3,y3) | ss(x4,y3) | ... |
| y4 | ss(x1,y4) | ss(x2,y4) | ss(x3,y4) | ss(x4,y4) | ... |
| ... | ... | ... | ... | ... | ... |

| IRT2, A1 | x1 | x2 | x3 | x4 | ... |
|---|---|---|---|---|---|
| y1 | ss(x1,y1) | ss(x2,y1) | ss(x3,y1) | ss(x4,y1) | ... |
| y2 | ss(x1,y2) | ss(x2,y2) | ss(x3,y2) | ss(x4,y2) | ... |
| y3 | ss(x1,y3) | ss(x2,y3) | ss(x3,y3) | ss(x4,y3) | ... |
| y4 | ss(x1,y4) | ss(x2,y4) | ss(x3,y4) | ss(x4,y4) | ... |
| ... | ... | ... | ... | ... | ... |

Fig. 9

WIRELESS NODE LOCATION MECHANISM USING ANTENNA PATTERN DIVERSITY TO ENHANCE ACCURACY OF LOCATION ESTIMATES

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. application Ser No. 10/183,704 in the name of Robert J. Friday, Patrice R. Calhoun, Robert B. O'Hara, Jr., Alexander H. Hills and Paul F. Dietrich, and entitled "Method and System for Dynamically Assigning Channels Across Multiple Radios in a Wireless LAN;"

U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,370 in the name of Patrice R. Calhoun, Robert B. O'Hara, Jr. and David A. Frascone, entitled "Wireless Network System Including Integrated Rogue Access Point Detection;"

U.S. application Ser. No. 10/477,735 in the name of Robert B. O'Hara, Jr., Robert J. Friday, Patrice R. Calhoun, and Paul F. Dietrich and entitled "Wireless Network Infrastructure including Wireless Discovery and Communication Mechanism;" and U.S. application Ser. No. 10/611,522 in the name of Robert J. Friday and entitled "Non-Overlapping Antenna Pattern Diversity in Wireless Network Environments."

CROSS-REFERENCE TO RELATED APPLICATIONS

The present application claims priority from U.S. patent application Ser. No. 10/783,186 filed on Feb. 20, 2004 and entitled "Wireless Node Location Mechanism using Antenna Pattern Diversity to Enhance Accuracy of Location Estimates" and is herein incorporated by reference.

FIELD OF THE INVENTION

The present invention relates to location of wireless nodes in wireless network environments and, more particularly, to a wireless node location mechanism employing antenna pattern diversity to enhance the accuracy of estimating the location of wireless nodes.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the glove. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

The rapid proliferation of lightweight, portable computing devices and high-speed WLANs has enabled users to remain connected to various network resources, while roaming throughout a building or other physical location. The mobility afforded by WLANs has generated a lot of interest in applications and services that are a function of a mobile user's physical location. Examples of such applications include: printing a document on the nearest printer, locating a mobile user, displaying a map of the immediate surroundings, and guiding a user inside a building. The required or desired granularity of location information varies from one application to another. Indeed, the accuracy required by an application that selects the nearest network printer, or locates a rogue access point, often requires the ability to determine in what room a mobile station is located. Accordingly, much effort has been dedicated to improving the accuracy of wireless node location mechanisms.

The use of radio signals to estimate the location of a wireless device or node is known. For example, a Global Positioning System (GPS) receiver obtains location information by triangulating its position relative to four satellites that transmit radio signals. The GPS receiver estimates the distance between each satellite based on the time it takes for the radio signals to travel from the satellite to the receiver. Signal propagation time is assessed by determining the time shift required to synchronize the pseudo-random signal transmitted by the satellite and the signal received at the GPS receiver. Although triangulation only requires distance measurements from three points, an additional distance measurement from a fourth satellite is used for error correction.

The distance between a wireless transmitter and a receiver can also be estimated based on the strength of the received signal, or more accurately the observed attenuation of the radio signal. Signal attenuation refers to the weakening of a signal over its path of travel due to various factors like terrain, obstructions and environmental conditions. Generally speaking, the magnitude or power of a radio signal weakens as it travels from its source. The attenuation undergone by an electromagnetic wave in transit between a transmitter and a receiver is referred to as path loss. Path loss may be due to many effects such as free-space loss, refraction, reflection, aperture-medium coupling loss, and absorption.

In business enterprise environments, most location-tracking systems are based on RF triangulation, RF fingerprinting or Time Difference Of Arrival (TDOA) techniques. RF triangulation calculates a mobile user's location based upon the detected signal strength of nearby access points (APs). It assumes that signal strength represents the radius of a circle on which the mobile user is located. Given several circles, whose centers are the access points at known locations, it attempts to find the intersection of the circles to locate the mobile. However, the multipath phenomenon encountered in indoor RF environments does present certain difficulties for location systems using triangulation, since reflection and absorption of RF signals affects the correlation between signal strength and proximity. RF fingerprinting compares a mobile station's view of the network infrastructure (i.e., the strength of signals transmitted by infrastructure access points) with a database that contains an RF physical model of the coverage area. This database is typically populated by either an extensive site survey or an RF prediction model of the coverage area. For example, Bahl et al., "A Software System for Locating Mobile Users: Design, Evaluation, and Lessons," http://research.microsoft.com/~bahl/Papers/Pdf/ radar.pdf, describes an RF location system (the RADAR system) in a WLAN environment, that allows a mobile station to track its own location relative to access points in a WLAN environment.

The RADAR system relies on a so-called Radio Map, which is a database of locations in a building and the signal strength of the beacons emanating from the access points as observed, or estimated, at those locations. For example, an entry in the Radio Map may look like (x, y, z, $ss_i$ (i=1 ... n)), where (x, y, z) are the physical coordinates of the location where the signal is recorded, and $ss_i$ is the signal strength of the beacon signal emanating from the with access point. According to Bahl et al., Radio Maps may be empirically created based on heuristic evaluations of the signals transmitted by the infrastructure radios at various locations, or mathematically created using a mathematical model of indoor RF signal propagation. To locate the position of the mobile user in real-time, the mobile station measures the signal strength of each of access points within range. It then searches a Radio Map database against the detected signal strengths to find the location with the best match. Bahl et al. also describe averaging the detected signal strength samples, and using a tracking history-based algorithm, to improve the accuracy of the location estimate. Bahl et al. also address fluctuations in RF signal propagation by using multiple Radio Maps and choosing the Radio Map which best reflects the current RF environment.

Given the range of potential location-based wireless applications, further improvements to the accuracy and range of wireless node location mechanisms are desired. For example, while the RADAR system allows a mobile station to tract its location, it does not disclose a system that allows the WLAN infrastructure to track the location of wireless nodes without software installed on the device being tracked, allowing devices such as rogue access points to be located. In addition, while the systems discussed above fulfill their respective objectives, they do not disclose or suggest the use of antenna pattern diversity to enhance the accuracy of wireless node location in an RF environment.

SUMMARY OF THE INVENTION

The present invention provides methods, apparatuses and systems directed to a wireless node RF Fingerprinting location mechanism that uses multiple antenna patterns to enhance the accuracy of wireless node location in an RF environment. In one implementation, substantially non-overlapping antenna pattern diversity is used to provide a degree of sectorization in computing the estimated location of a wireless node. As discussed in more detail below, the wireless node location mechanism can be incorporated into wireless network environments, such as 802.11 networks, to estimate the location of mobile stations, rogue access points and other wireless nodes.

DESCRIPTION OF THE DRAWINGS

FIG. 4 is a flow chart diagram providing a method, according to an embodiment of the present invention, directed to the selection of an antenna during receipt of a wireless protocol frame.

FIG. 5 is a flow chart diagram illustrating the overall process flow directed to the location of a wireless node according to an implementation of the present invention.

FIG. 9 illustrates a subset of the coverage maps associated with different direction antennas in the wireless node location system according to one implementation of the present invention.

DESCRIPTION OF PREFERRED EMBODIMENT(S)

A. Wireless Node Location and Antenna Pattern Diversity

Figure 1:
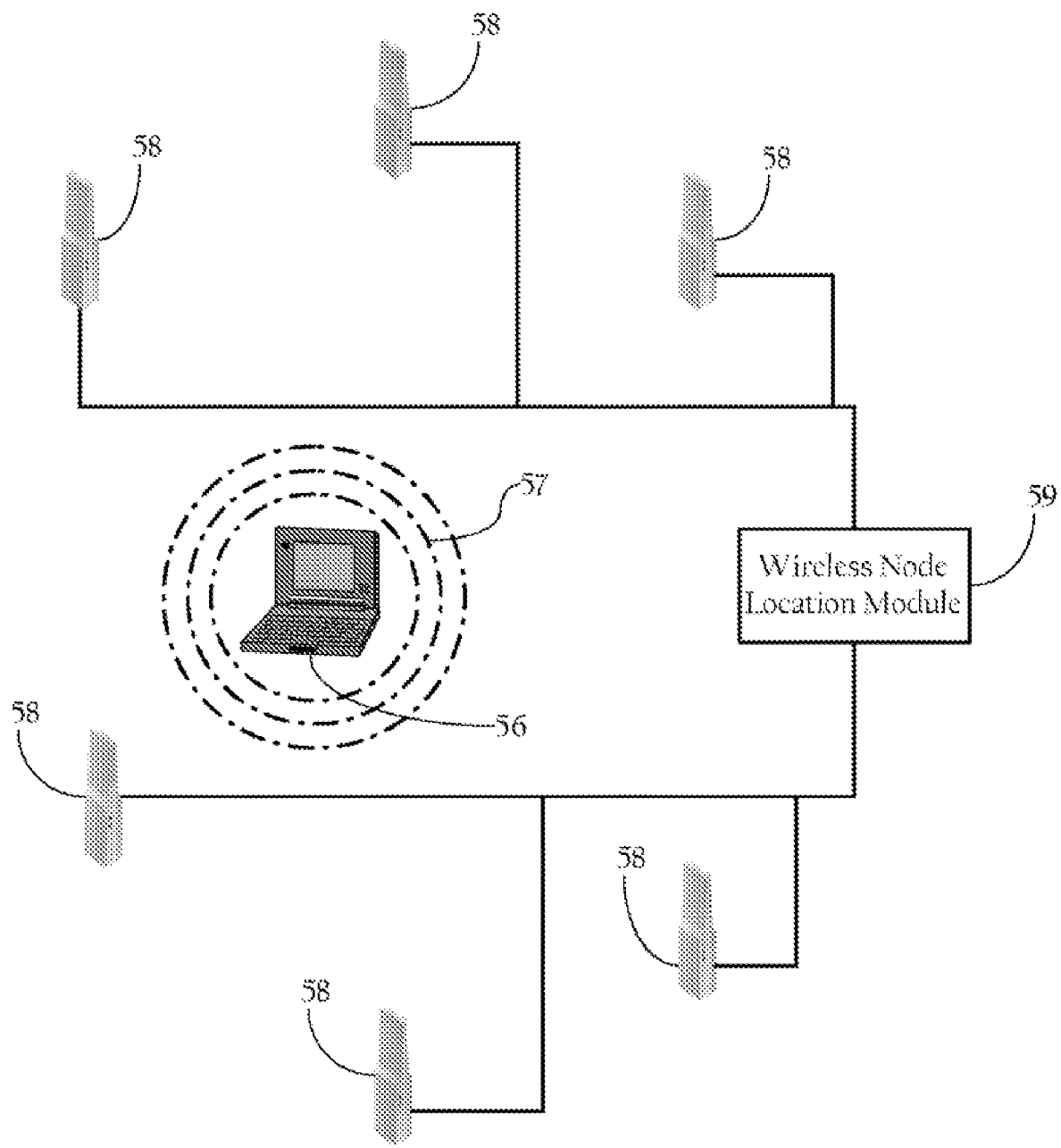
FIG. 1 is a schematic diagram including a wireless node location mechanism according to an implementation of the present invention.

FIG. 1 illustrates the basic operating components of the wireless node location mechanism according to an implementation of the present invention. As FIG. 1 shows, the wireless node location mechanism includes a wireless node location module 59 and a plurality of infrastructure radio transceivers 58 disposed throughout a physical space. One skilled in the art will recognize that the system depicted in FIG. 1 represents a simple example of the basic components of the invention and is mostly for didactic purposes. As discussed more fully below, the functionality generally denoted by infrastructure radio transceivers 58 and wireless node location module 59 can be integrated into a variety of systems, such as wireless systems dedicated for location of wireless nodes, or WLAN or other wireless network systems.

Infrastructure radio transceivers 58 generally comprise at least one antenna, a radio transmit/receive unit, and control logic (e.g., a 802.11 control unit) to control the transmission and reception of radio signals according to a wireless communications protocol. Infrastructure radio transceivers 58 are disposed in known locations throughout a physical space. As discussed below, at least one of the infrastructure radio transceivers 58 includes at least two directional antennas with, in one implementation, substantially non-overlapping patterns, and control functionality that selects one of the antennas for receipt of wireless protocol frames in the RF signals. Other antenna pattern configurations can be used in other embodiments of the present invention.

A.1. Infrastructure Radio Transceiver

Infrastructure radio transceivers 58 are operative to detect the strength of received radio-frequency (RF) signals, such as the signals 57 transmitted by wireless node 56 and by other radio transceivers, and provide the detected signal strength data for corresponding wireless nodes to wireless node location module 59. In one implementation, infrastructure radio transceivers 58 are also operative to transmit and receive wireless or radio-frequency signals according to a wireless communications protocol, such as the IEEE 802.11 WLAN protocol. Infrastructure radio transceivers 58, in one implementation, can operate on a selected channel from a plurality of channels in a given band. In another implementation, infrastructure radio transceivers 58 can also operate in more than one band. For example, infrastructure radio receivers 58 may be configured to operate in either the 802.11a-5 GHz band, and/or the 802.11b/g-2.4 GHz band. In one implementation, infrastructure radio transceivers 58 can be configured to collect the signal strength information associated with wireless nodes and transmit the collected data in response to SNMP or other requests by wireless node location module 59. As discussed below, other methods for collecting signal strength data may also be employed.

Identification of wireless nodes depends on the wireless communications protocol in use. For 802.11 WLAN environments, for example, wireless nodes can be identified based on MAC address. Furthermore, wireless nodes can be authorized mobile stations, such as remote client elements 16, 18 (see FIG. 6), rogue systems (e.g., rogue access points and/or rogue mobile stations), as well as authorized access points for which no location information is known. In other implementations, wireless nodes can be identified based on a unique property of the RF signal, such as a given frequency channel, or a unique signal pattern, and the like. For example, the wireless node location functionality may be employed to locate a detected source of interference, such as a non-802.11 compliant device.

In one implementation, infrastructure radio transceivers 58 are also operable to communicate with one or more mobile stations, such as wireless node 56, according to a wireless communication protocol. For example, radio transceiver 58, in one implementation, is an access point or other WLAN component. In one implementation, radio transceiver 58 is operably connected to a Local Area Network (LAN), Wide Area Network (WAN) or other wireline network to bridge traffic between mobile stations and the wireline network. As discussed more fully below, radio transceiver 58 may also be an access element or light weight access point in a wireless network featuring hierarchical processing of protocol information. In one implementation, the radio transceiver 58 implements the 802.11 protocols (where 802.11, as used herein, generically refers to the IEEE 802.11 standard for wireless LANs and all its amendments). Of course, the present invention can be used in connection with any suitable radio-frequency-based wireless network or communications protocol.

In one implementation, infrastructure radio transceivers 58 make use of the signal strength detection functionality residing on a wireless network interface adapter. For example, the IEEE 802.11 standard defines a mechanism by which RF energy is measured by the circuitry (e.g., chip set) on a wireless network adapter or interface card. The IEEE 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. For example, the detected Signal-to-Noise Ratio (SNR) during packet reception can be used in determining overlay signal transmit power. Again, many chip sets include functionality and corresponding APIs to allow for a determination of SNRs associated with packets received from other transceivers 58 and/or wireless node 56.

A.1.a. Non-Overlapping Antenna Patterns and Antenna Selection

As discussed above, at least one infrastructure radio transceiver 58 includes a plurality of directional antennas and functionality that selects one of the antennas for receipt of wireless frames encoded in RF signals. Infrastructure radio transceivers 58 that operate in connection with only one antenna may include a directional or an omni-directional antenna.

Figure 2A:
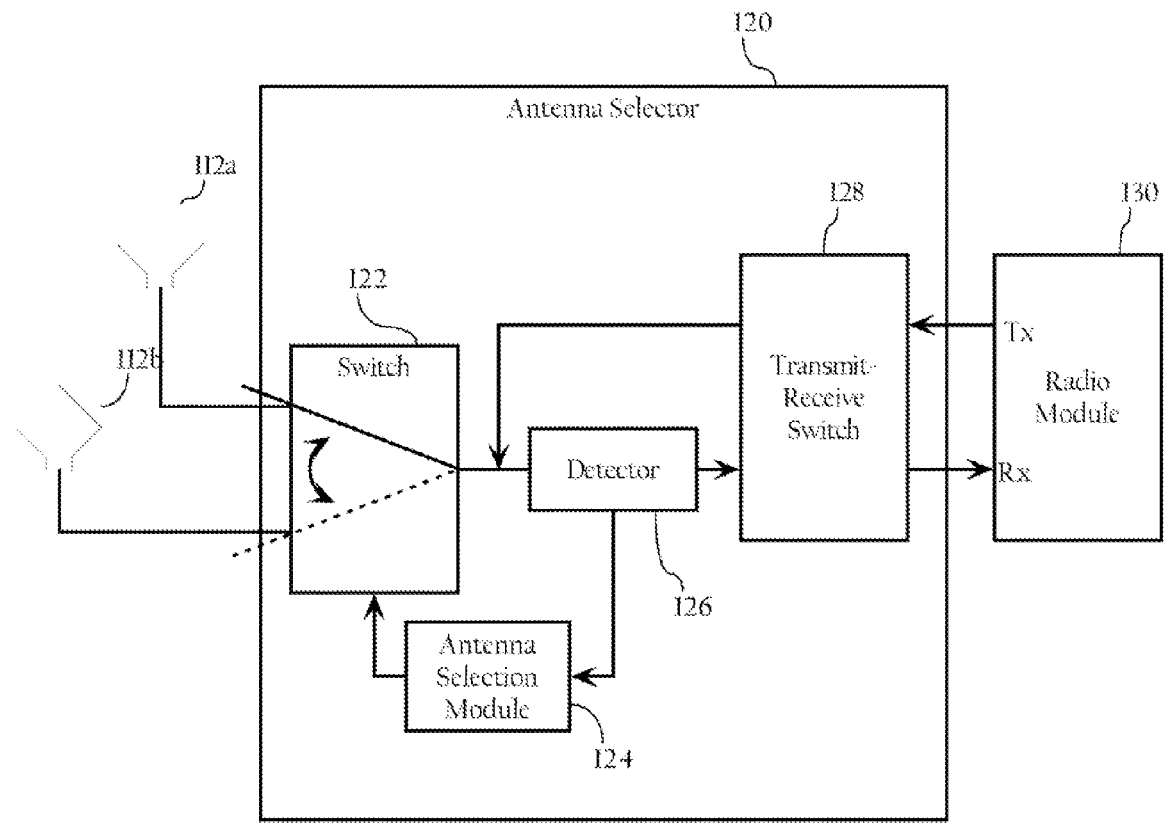
FIG. 2 is a functional block diagram illustrating an antenna selector according to an embodiment of the present invention.
FIG. 2B is a functional block diagram showing a wireless network interface unit according to an embodiment of the present invention.
Figure 2B:
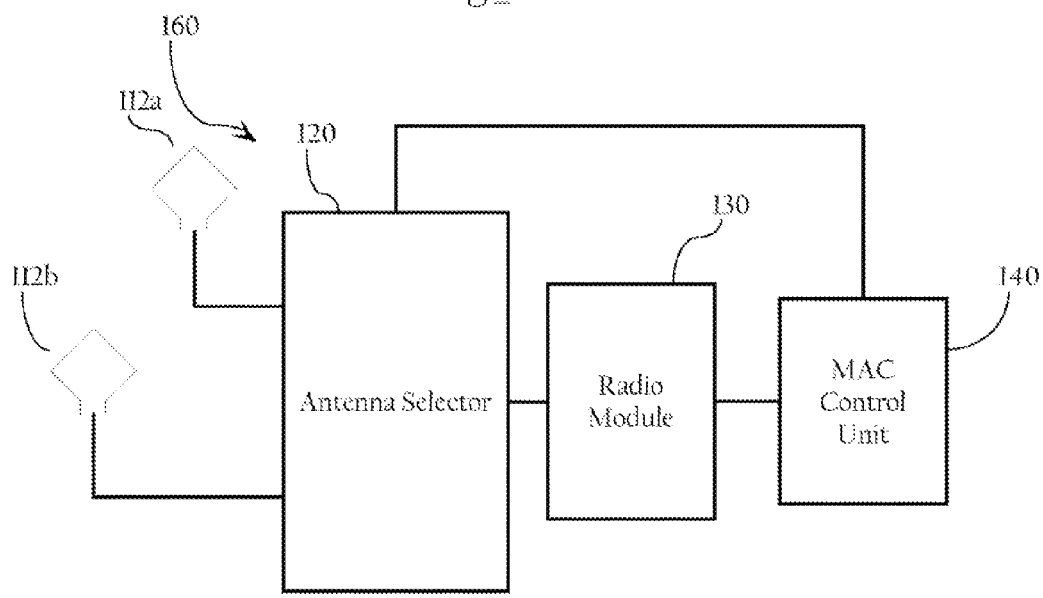

U.S. application Ser. No. 10/611,522, incorporated by reference herein, discloses antenna selection in connection with non-overlapping antenna pattern diversity. FIGS. 2A and 2B set forth antenna selection and associated functionality included in an infrastructure radio transceiver 58, according to an implementation of the present invention. FIG. 2A illustrates an antenna selector 120, according to an embodiment of the present invention. As FIG. 2B illustrates, the antenna selector 120, in one embodiment, is part of a wireless network interface unit 160 comprising antennas 112*a* & 112*b*, antenna selector 120, radio module 130, and MAC control unit 140. In one embodiment, the functionality described herein can be implemented in a wireless network interface chip set, such as an 802.11 network interface chip set. Radio module 130 includes frequency-based modulation/demodulation functionality for, in the receive direction, demodulating radio frequency signals and providing digital data streams, and in the transmit direction, receiving digital data streams and providing frequency modulated signals corresponding to the digital data stream. In one embodiment, radio module 130 is an Orthogonal Frequency Division Multiplexed modulation/demodulation unit. In one embodiment, radio module 30 implements the OFDM functionality in a manner complaint with the IEEE 802.11a and 802.11g protocol. MAC control unit 140 implements data link layer functionality, such as detecting individual frames in the digital data streams, error checking the frames, and the like. In one embodiment, MAC control unit 140 implements the 802.11 wireless network protocol. Other suitable wireless protocols can be used in the present invention.

Antenna selector 120 is operative to receive signals transduced by antennas 112*a*, 112*b*, select an antenna based on detected signal attributes associated with the antennas, and provide the signal corresponding to the selected antenna to radio module 130. In one implementation, the directional antennas have a wide beamwidth directed away from each other. In one implementation, each directional antenna has a horizontal beamwidth of about 180 degrees. Of course, other deployments may require narrower or wider horizontal beamwidths. In one implementation, the directional antennas also feature suitable front-to-back isolation to minimize the RF energy that is detected from signals emanating from behind the intended coverage area of the antenna. In one implementation, antennas 112*a*, 112*b* are directional antennas having substantially, non-overlapping patterns to enhance the sectorization capabilities discussed herein. Although the various Figures show two antennas, the present invention can operate in conjunction with more than two directional antennas having substantially non-overlapping patterns. Antennas 112a, 112b can be any suitable directional antennas, such as patch antennas, yagi antennas, parabolic and dish antennas.

Figure 8A:
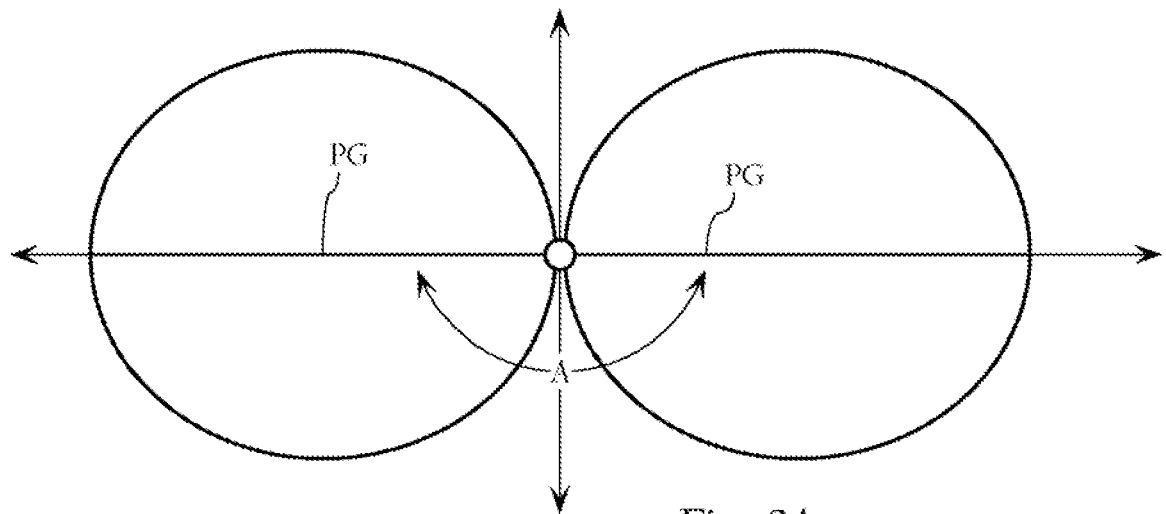
FIGS. 8A, 8B and 8C are plots illustrating the possible orientation of a plurality of antennas according to the offset of peak grain according to different embodiments of the present invention.
Figure 8B:
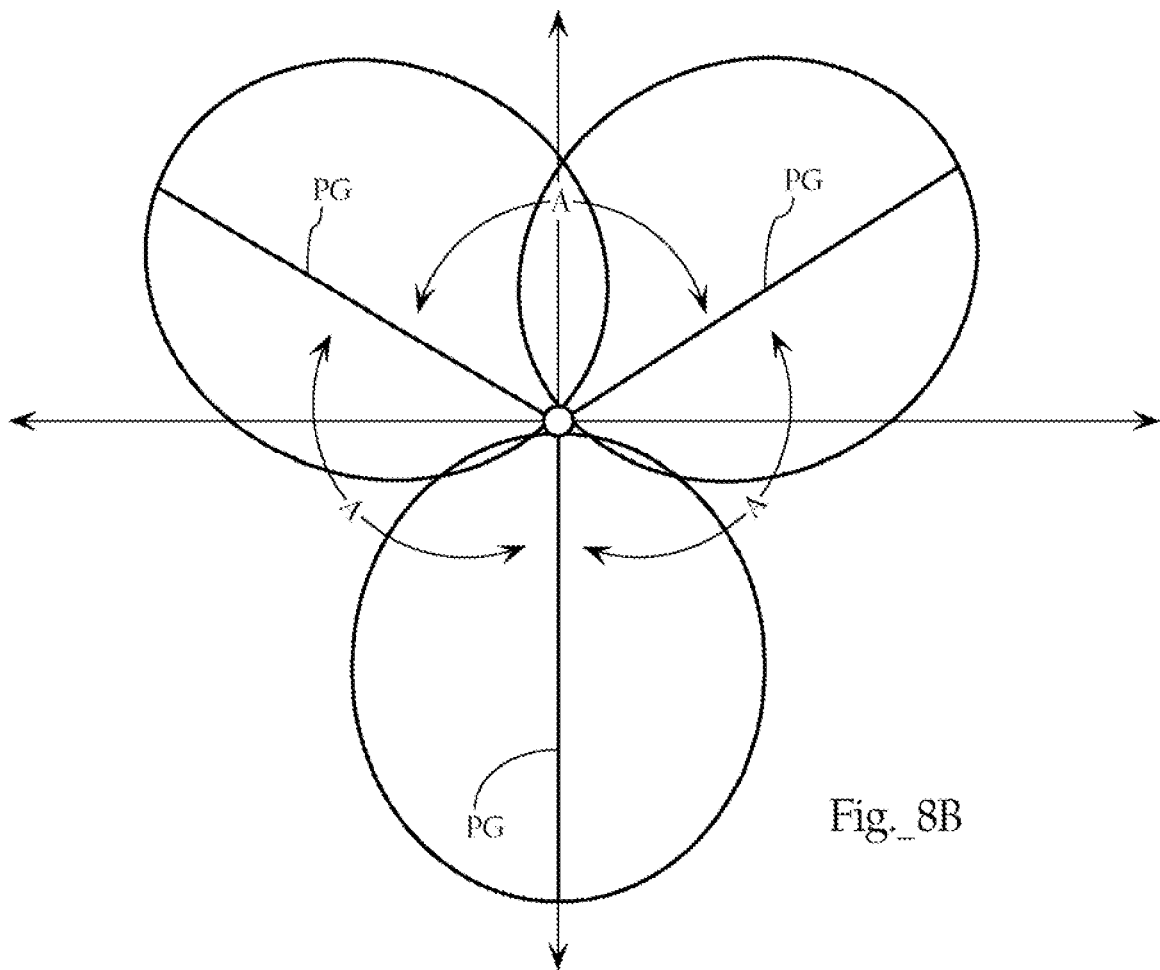
Figure 8C:
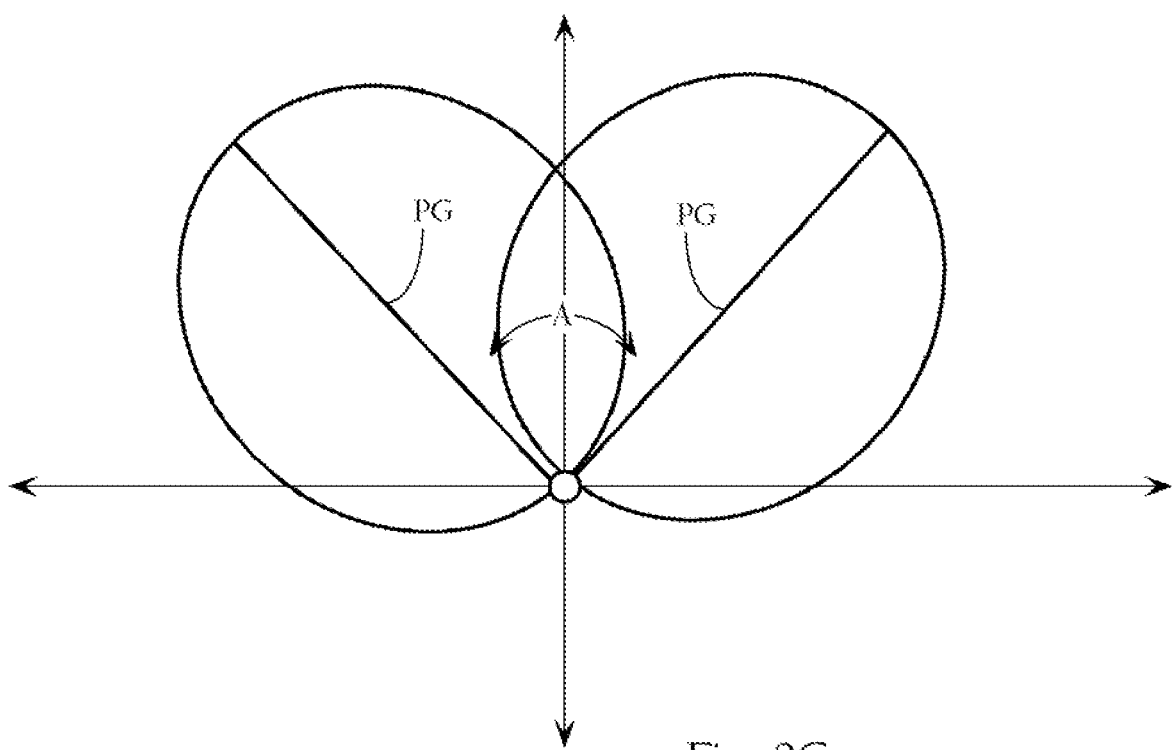

In one embodiment, the peak grains of the antennas are offset from one another in a manner that maximizes coverage in all directions. In one embodiment, the peak gains of the antennas are oriented relative to each other at an angle A about the vertical or z-axis, where A is equal to 360/n degrees±10 degrees (where n is the number of antennas). Accordingly, for a two-antenna system (see FIG. 8A), the peak gains PG of the antennas are oriented at about 180 degrees from each other about the vertical axis. For a three-antenna system (see FIG. 8B), the peak gains PG of the antennas are oriented at about 120 degrees from each other, and so on. In other embodiments, the peak gains of the antennas can be offset from one another at other angles determined according to other factors or criteria. For example, the peak gains of two antennas located at the end of a room may be offset at 90 degrees relative to each other (see FIG. 8C). As one skilled in the art will appreciate, embodiments of the present invention essentially effect a sectorization capability to the infrastructure radio transceiver 58 including the antenna selection functionality described herein. Embodiments of the present invention enhance performance under load conditions in that, by selecting a given antenna, the effect of noise and other signal interference sources emanation from being the selected antenna are greatly attenuated or cutoff. Furthermore, this sectorization also results in increased performance. For example and in one embodiment, the use of a directional antenna can result in coverage gains of 6 to 8 dBi, while the typical gain associated with an omni directional antenna is 0 to 2 dBi. Furthermore, the use of directional antennas enhances the accuracy of estimating the location of a wireless node, as the sectorization provided by the antenna computationally eliminates, or reduces the effect of, regions outside the beamwidth and/or being the intended coverage area of the selected antenna. Accordingly, wireless node location can be enhanced by strategically placing the infrastructure radio transceivers relative to each other and the physical deployment location, and orienting the respective directional antennas of the infrastructure radio transceivers to correspond to various sectors of the physical deployment location.

As FIG. 2A illustrates, antenna selector 120, in one embodiment, comprises switch 122, antenna selection module 124 and detector 126. Switch 122 is operative to switch between a plurality of antennas, such as antennas 112a, 112b, under control signals provided by antenna selection module 123. Detector 126 detects at least one attribute of the signal received at the antennas, as discussed more fully below. Antenna selection module 124 receives signal attributes from the detector 126 and provides control signals to switch 122 to switch among the available antennas. Antenna selection module 124, in one embodiment, further includes control logic for selecting an antenna for receipt of a signal corresponding to a packet or frame, as discussed more fully below. As FIG. 2A illustrates, antenna selector 120 may further include transmit/receive switch 128 to allow signals in the transmit direction to by-pass detector 126. As discussed below, other architectures are possible.

Detector 126 can detect one to a plurality of signal attributes, such as signal strength, signal-to-noise ratio, etc. In one embodiment, the functionality of detector 126 is embodied within an integrated circuit. One skilled in the art will recognize that such signal attribute detection functionality is part of standard 802.11 wireless chip sets, as discussed above. As to signal strength, the detector 126 can provide absolute signal strength values, such as decibels (dBs) or relative indicators, such as RSSI values.

Antenna selection module 124, during the preliminary or preamble portion of the RF signal, evaluates the signals received at each antenna, such as antenna 112a, and 112b, and selects an antenna for receipt of the remaining signal data corresponding to the wireless packet or frame. For example, according to the 802.11 protocol. MAC sublayer data units are mapped into a framing format suitable for wireless transmission. The MAC sublayer data units, according to the 802.11 protocol, are essentially encapsulated by a PLCP preamble and a PLCP header, thereby forming a PLCP protocol data unit (PPDU). The PLCP header generally includes a SYNC field and Start Frame Delimiter (SFD). The SYNC field allows the receiver to perform necessary operations for synchronization, while the SFD indicates the start of PHY layer-dependent parameters in the PLCP header. According to the 802.11 protocol, once the signal associated with the synchronization field is detected, the PHY layer functionality of the receiver searches for the SFD to begin processing the PHY-dependent parameters in the PLCP header. In one embodiment, during receipt of the preamble, antenna selection module 124 evaluates the signals transduced by antennas 112a, 112b (as provided by detector 126) and selects an antenna based on the detected signal attributes. The selected antenna is then used to receive the signal for the remainder of the PPDU.

FIG. 4 illustrates a method, according to an embodiment of the present invention, directed to selecting an antenna during receipt of the frame preamble. In the listening mode, the infrastructure radio transceiver 58 can operate in either a slow or fast receive diversity scheme when listening for wireless frames. For example, in a slow receive diversity scheme, the radio switches to another antenna if no signal is detected on the current antenna within a threshold period of time. In a fast receive diversity scheme, the infrastructure radio transceiver 58 in the listen state switches frequently (e.g., every 1 to 3 microseconds) between the available antennas. As FIG. 4 shows, when a frame preamble is detected (202), antenna selection module 124 selects a first antenna and transmits control signals to switch 122 which switches the circuit to allow signals received at the selected antenna to pass to detector 126. Detector 126, as discussed above, detects at least one attribute of the received signal (206). Antenna selection module 124 then selects another antenna, transmitting control signals to switch 122. This process is repeated, in one embodiment, for all antennas connected to switch 122 (204). The time spent detecting the signal attribute(s) for each antenna depends on both the number of antennas and the length of the farm preamble (as defined by the wireless networking protocol employed). For example, in a wireless network employing the IEEE 802.11g protocol, the long PLCP preamble is 128 microseconds. Accordingly, assuming that two antennas are used, antenna selection module 124 can allocate a maximum of about 128 microseconds to detect the signal attributes for each antenna and to make a selection. Of course, the use of additional antennas reduces this maximum number of samples per antenna that can be used to select an antenna. After the signals of all antennas have been analyzed, antenna selection module 124 selects one of the antennas to be used for receipt of the remainder of the frame (208). Antenna selection is based on the detected signal attribute(s). For example, antenna selection module 124, in one embodiment, selects the antenna associated with the highest signal strength. In another embodiment, antenna selection can be based on the observed signal-to-noise ratio. In yet another embodiment, antenna selection can be based on both signal strength and signal-to-noise ratios, where the two factors can be weighted. Of course, antenna selection can be driven by other considerations, such as the historical performance of a given antenna versus the other antennas. As FIG. 4 shows, antenna selection module 124 then transmits control signals to switch 24 designating the selected antenna (210).

In one embodiment, the antenna selection module 124 provides the identifier corresponding to the selected antenna to radio module 130 or MAC control unit 140 (212). MAC control unit 140 can then store the selected antenna identifier and the MAC address in a table or other suitable data structure. As discussed in more detail below, the identifier corresponding to the selected antenna is used to enhance the accuracy of estimating the location of wireless nodes. In one embodiment, the identifier corresponding to the selected antenna is later stored in association with the MAC address of the source transmitter or wireless node.

As FIG. 4 illustrates, after receipt of the frame is completed (214), other operations can be performed. For example, an acknowledgment (ACK) frame can be transmitted to indicate that the frame was properly received. In one embodiment, the antenna selected to receive the farm is used to transmit the acknowledgment frame. Of course, other frames can also be transmitted to the wireless client, such as authentication response frames and association response frames. After completion of such operations, the system resumes the listen mode, assuming no frames are to be sent.

Figure 3A:
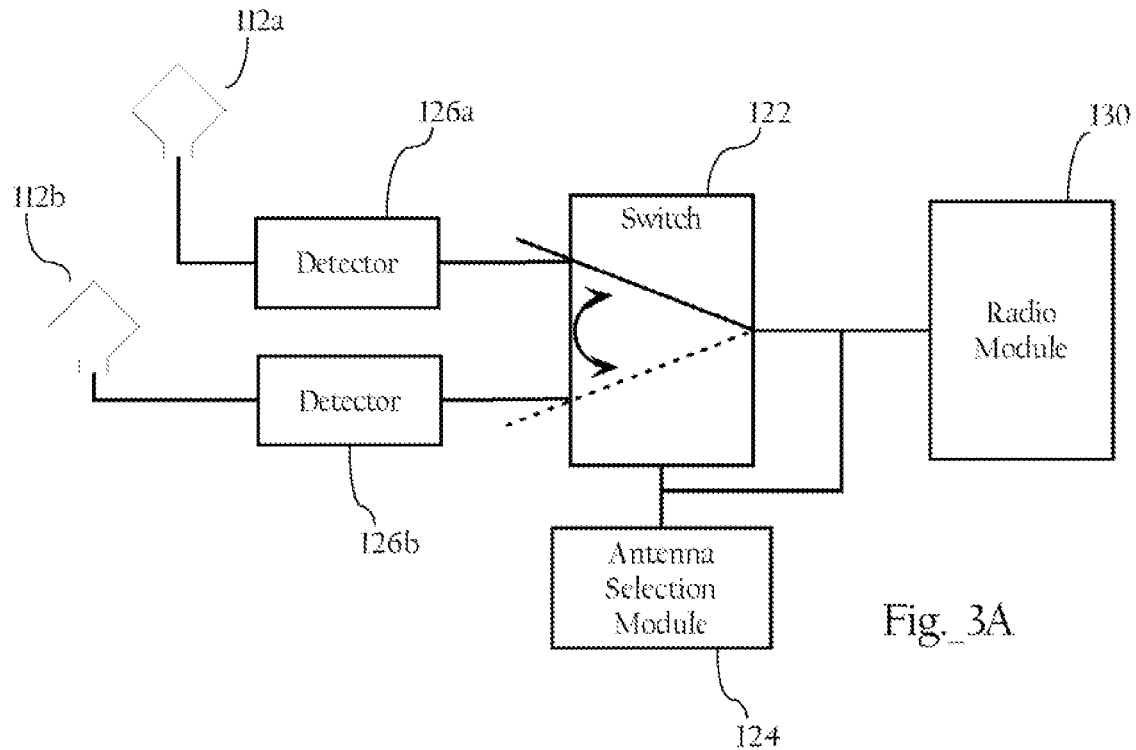
FIG. 3A is a functional block diagram providing an antenna selector according to a second embodiment of the present invention.
Figure 3B:
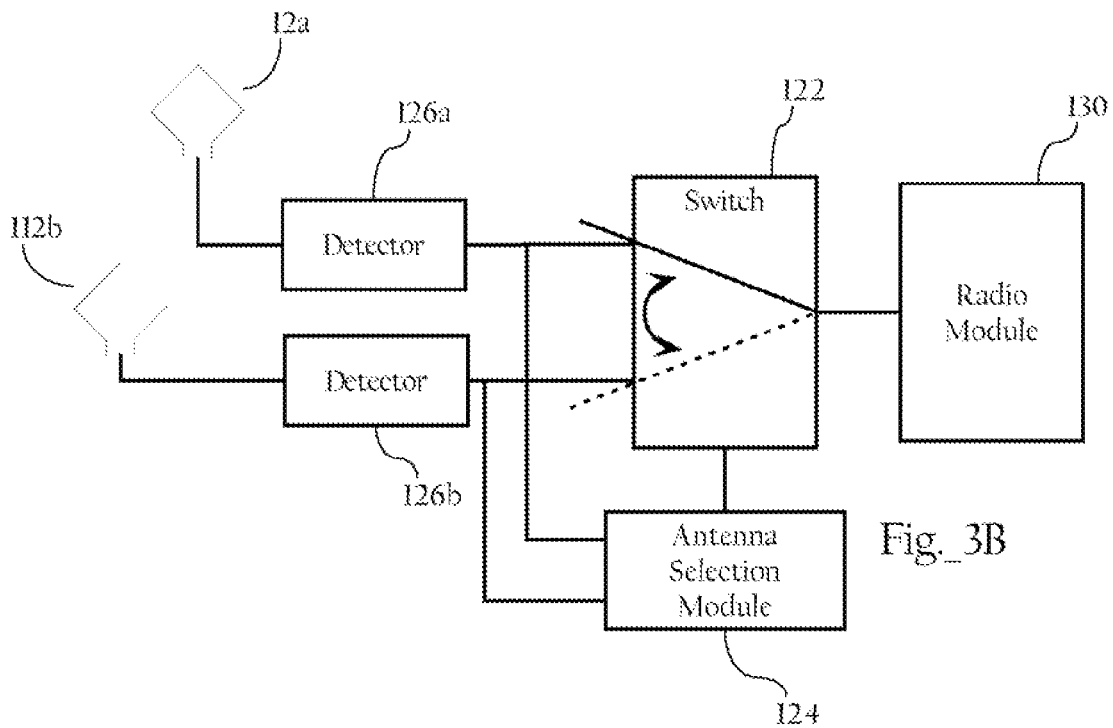
FIG. 3B is a functional block diagram setting forth an antenna selector according to a third embodiment of the present invention.

Other embodiments of the antenna selection functionality are possible. FIGS. 3A and 3B illustrate alternative embodiments of antenna selector 120. Whereas, in the embodiment depicted in FIG. 2B, the detection of signal attributes associated with each antenna occurs in serial, the antenna selectors 120 depicted in FIGS. 3A and 3B operate in a parallel manner. Specifically, in the embodiment of FIG. 3A, parallel detectors 126a, 126b provide the signal attributes associated with antennas 112a, 112b to antenna selection module 124 via switch 122. In this embodiment, antenna selection module 124 obtains the signal attributes from detectors 126a, 126b in a serial manner by transmitting control signals to switch 122. Similarly, in the embodiment shown in FIG. 3B, detectors 126a, 126b provide the detected signal attributes directly to antenna selection module 124, which analyzes the attributes, selects an antenna for receipt of the frame, and transmits corresponding control signals to switch 122.

A.2. Wireless Node Location Module

Wireless node location module 59, in one implementation, collects signal strength data received from infrastructure radio transceivers 58 and maintains the signal strength data in association with a wireless node identifier, an identifier for the infrastructure radio transceiver 58 which provided the signal strength data, and an identifier for the antenna selected to receive the RF signal encoding the wireless frame or packet. For infrastructure radio transceivers 58 that only include one antenna, different schemes may be employed. In one implementation, such infrastructure radio transceivers 58 can be configured to report a default antenna identifier (e.g., antenna 1). In another implementation, wireless node location module 59 inserts a default antenna identifier for infrastructure radio transmitters 58 that do not identify a selected antenna. In one implementation, if the antennas identifiers are unique across the RF WLAN infrastructure, only the antenna identifiers need to be collected and stored in association with the signal strength information.

Wireless node location module 59, in one implementation, is also configured to distinguish between signals received from infrastructure radio transceivers 58 and signals received from other wireless nodes based on the wireless node identifier. In one implementation, wireless node location module 59 maintains a variety of data structures for storing signal strength information. For example, one data structure is used to store the signal strength of signals transmitted between infrastructure radio transceivers 58. In one implementation, wireless node location module 59 stores this signal strength data in a N×N matrix, where N is the number of infrastructure radio transceivers. The column entries can correspond to the transmitting transceiver, while the row entries correspond to the receiving transceiver, or vice versa. Various entries in this matrix may be null values as all infrastructure radio transceivers may not, and in most deployments probably will not, be able to detect one another. Wireless node location module 59, in one implementation, maintains signal strength data for all other wireless nodes in tables or other suitable data structures. In one implementation, wireless node location module 59 maintains, for each radio transceiver 58, a separate table including at least three fields: 1) a wireless node identifier; 2) the detected signal strength, and 3) a selected antenna identifier. Additional fields may also include a time stamp indicating the time the radio transceiver 58 received the signal. In one implementation, when the memory space allocated to the wireless node tables is depleted, the least recently used/updated entry as indicated by the time stamps is overwritten. In one implementation, wireless node location module 59 filters the signal strength data received from the infrastructure radio transceivers 58 against a list of wireless node identifiers in order to identify the appropriate data structure to update. One skilled in the art will recognize that a variety of data structures beyond matrixes and tables can be used.

As discussed above, signal strengths are detected, in one implementation, on a frame-by-frame basis. Accordingly, in one embodiment, the signal strength data maintained by wireless node location module 59 can be updated as the frames/packets are received. In one implementation, the latest signal strength value is used to essentially overwrite the old value. In other implementations, however, an average, moving average or weighted moving average can be used if successive wireless frames corresponding to a given wireless node are encountered within a threshold item interval (e.g., typically resulting from a data stream transmission). In such a situation, the time stamp can correspond to the time of the last packet or frame. In addition, while radio transceivers 58 when operating as access points typically operate on different channels, mobile stations at various times (e.g., transmitting probe requests to find access points) transmit wireless frames on all available operating channels. This helps to ensure that a plurality of radio transceivers 58 detect the mobile station. In some implementations, one or more infrastructure radio transceivers 58 that are adjacent to a radio transceiver 58 that detected a given wireless node may be directed to switch to a given operating channel to listen for signals transmitted by the mobile station. Still further, as discussed below, the infrastructure radio transceivers 58 may be commanded to specifically transmit frames on a given channel for the purpose of updating the signal strength data maintained by wireless node location module 59.

Wireless node location module 59 also maintains a RF physical model of the converge area associated with the RF environment. As discussed in more detail below, the RF physical model returns an estimated physical location of a wireless node, given the strength of signals detected by the infrastructure radio transceivers 58, as well as an indication of the antennas used to receive the signals. In one implementation, the RF physical model characterizes for each infrastructure radio transceiver antenna the expected receive signal strength associated with a wireless transmitter at a given location. For example, in one implementation, the RF physical model comprises, for each antenna, a radio coverage map or matrix that indicates the expected signal strength received from a wireless node, given a uniform transmit power, at a given location defined in x-, and y-coordinates. This database can be populated in a variety of ways. For example, the radio coverage maps can be populated with the results of an extensive site survey, according to which a wireless transmitter is placed at different locations in the physical space. During the site survey, the infrastructure radio transceivers 58 operate in a listening mode that cycles between the antennas and report the resulting signal strength in connection with an antenna identifier. In one implementation, the infrastructure radio transceivers 58 can be configured to transmit the signal strength/antenna data back to the wireless transmitter, which may be a laptop computer or other wireless device. The coverage maps are constructed by associating the signal strength and location data in the coverage maps corresponding to each infrastructure radio transceiver antenna. To estimate the location of the wireless node, wireless node location module 59 determines the location coordinates, or range of location coordinates, that best fit the coverage maps associated with the antennas selected to locate the wireless node based on the detected signal strength data.

FIG. 9 illustrates a subset of the coverage maps for two infrastructure radio transceivers 58 (IRT1 and IRT2). In the implementation shown, the infrastructure radio transceiver 58 identified as IRT1 includes two directional antennas, identified as A1 and A2, respectively, while the infrastructure radio transceiver 58 identified as IRT2 only includes a single antenna (either directional or omni-directional). In one implementation, a converge map, for each infrastructure radio transceiver antenna, is maintained that includes the signal strengths in an N×M matrix, where N is the number of x-coordinates in the coverage map, and M is the number of y-coordinates in the coverage map. In one implementation, the extent of the physical space model by the coverage maps for each antenna are co-extensive. The coverage maps for all antennas can be co-extensive with the physical space in which the location system is deployed, or with a boundary configured by a network administrator. Accordingly, for directional antennas with sufficient front-to-back isolation, the signal strength values in a given coverage map will likely include higher values in locations in front of a given directional antenna, and lower signal strength values in locations in back of the antenna. In one implementation, however, knowledge of various antenna attributes—such as the peak gain orientation, beamwidth, front-to-back isolation—can be used to compress the coverage maps. In one implementation, the coverage maps can be configured to be substantially coextensive with the antenna pattern of each antenna out to a threshold signal strength or gain level. For example, the coverage map for a given antenna can be compressed to the front or intended coverage area of the directional antenna. Of course, other data structures can be used such as a table including location coordinates stored in association with tuples of signal strengths and infrastructure radio transceiver antenna identifiers. In addition, if the coverage maps are compressed, the search for the best fit can be isolated to the overlap between coverage maps associated with the antennas selected to locate the wireless node.

In another implementation, the RF physical model may be constructed using an RF prediction model of the coverage area, using mathematical techniques like ray-tracing, and the like. In one implementation, the RF prediction model can be computed for each coordinate location in a desired physical space. The estimated signal strength information for each infrastructure radio transceiver antenna can be used to populate the coverage maps discussed above. In an alternative embodiment, RF prediction models can be computed relative to each infrastructure radio transceiver antenna. If symmetry is assumed between the propagation of signals between wireless nodes and the infrastructure radio transceivers 58, the coverage maps for each infrastructure radio transceiver antenna can be populated by subtracting the estimated attenuation at each coordinate location from an assumed uniform transmit power. Of course, site survey data can also be used to adjust one or more parameters associate with the RF predication model used to estimate expected signal strength at the various locations. As above, the boundaries of the coverage maps can be contoured based on the properties of the directional antennas. In addition, the location coordinates in the coverage maps can be two-dimensional, x- and y-coordinates, defining location in a horizontal plane. The location coordinates can also be three-dimension x-, y- and z-coordinates. Other coordinate systems can be used, such as spherical coordinates or cylindrical coordinates. In addition, the values of the coordinates can be either global (i.e., longitude and latitude) or expressed relative to an arbitrarily-defined origin. In addition, the granularity of the coordinates in the coverage maps depends on the desired granularity of the wireless node location estimates.

As discussed above, the transmit power of the wireless node is assumed or estimated, since the signals transmitted by the wireless nodes are detected by infrastructure radio transceivers 58. In 802.11 WLAN environments, for example, the total effective transmit power of wireless nodes is generally uniform across 802.11-compliant devices, given both legal limitations, as well as limitations imposed by 802.11 chip sets, both of which impose upper limitations on total effective transmit power. In one implementation, an OID-transmit power table (or other data structure) can be used to translate the OID bits of a MAC address into a transmit power. The table can be populated based on heuristic evaluations of various wireless networking equipment from different manufacturers, or from published product specifications from the manufacturers.

In one implementation, the wireless node location module 59 includes more than one RF physical model of the environment (in one implementation, each RF physical model is a set of coverage maps corresponding to the antennas of the infrastructure radio transceiver 58), and uses signals transmitted between the infrastructure radio transceiver 58 to dynamically select one of the RF physical models (such as a set of coverage maps) that best characterizes the current RF environment. As discussed above, the propagation of RF signals is effected by a variety of objects, including people, that move within an RF environment. In one implementation, the wireless node location functionality can compare the signal strength data in the N×N IRT signal strength matrix and the known locations of the infrastructure radio transceivers against the RF physical models to find the best fit. In one implementation, Infrastructure radio transceivers 58 can be configured to transmit wireless frames at regular intervals on one to a plurality of operating channels within a given frequency band to allow for the other infrastructure radio transceivers 58 to detect the signals. U.S. application Ser. No. 10/447,735 discloses the transmission of frames for detection by neighboring WLAN transceivers. In another implementation, infrastructure radio transceivers 58 transmit frames, on demand, in response to a command issued by wireless node location module 59.

FIG. 5 illustrates an overall process flow directed to locating a wireless node according to an implementation of the present invention. The wireless node location functionality can be triggered on demand, for example, in response to a command issued by a network administrator using a control interface to locate a mobile station identified by a MAC address or other suitable identifier. Wireless node location module 59 may also be triggered automatically in response to the detection of a rogue access point. U.S. application Ser. No. 10/407,370, incorporated by reference above, discloses detection of rogue access points in a wireless network system. Wireless node location module 59 can also be configured to periodically determine the location of a given mobile station in order to track its movement over a period of time.

As FIG. 5 illustrates, wireless node location module 59, in one implementation, begins by selecting the infrastructure radio transceivers (IRTs) 58 whose signal measurements will be used in locating the desired wireless node (302). In one implementation, wireless node location module 59 scans the data structures discussed above to identify the infrastructure radio transceivers 58 that see or detect wireless frames transmitted by the desired wireless node. In implementations where signal strength data is regularly collected (as opposed to on demand), the time stamps in the data structures can be used to filter out infrastructure radio transceivers 58 that have not detected the desired wireless node within a threshold period of time. Additional or alternative filter criteria can include a threshold signal strength level. In one implementation, if an insufficient number of infrastructure radio transceivers 58 are identified, wireless node location module 59 can command the infrastructure radio transceivers 58 to actively scan for the desired wireless node and return signal strength information.

Wireless node location module 59 then selects the RF coverage maps to be used in estimating the location of the wireless node based on the antenna identifiers (304). Wireless node location module 59 then computes the estimated location of the wireless node based on the selected RF coverage maps and the signal strength data reported by the selected infrastructure radio transceivers 58 (306).

B. Integration into Wireless Network Systems

Figure 6:
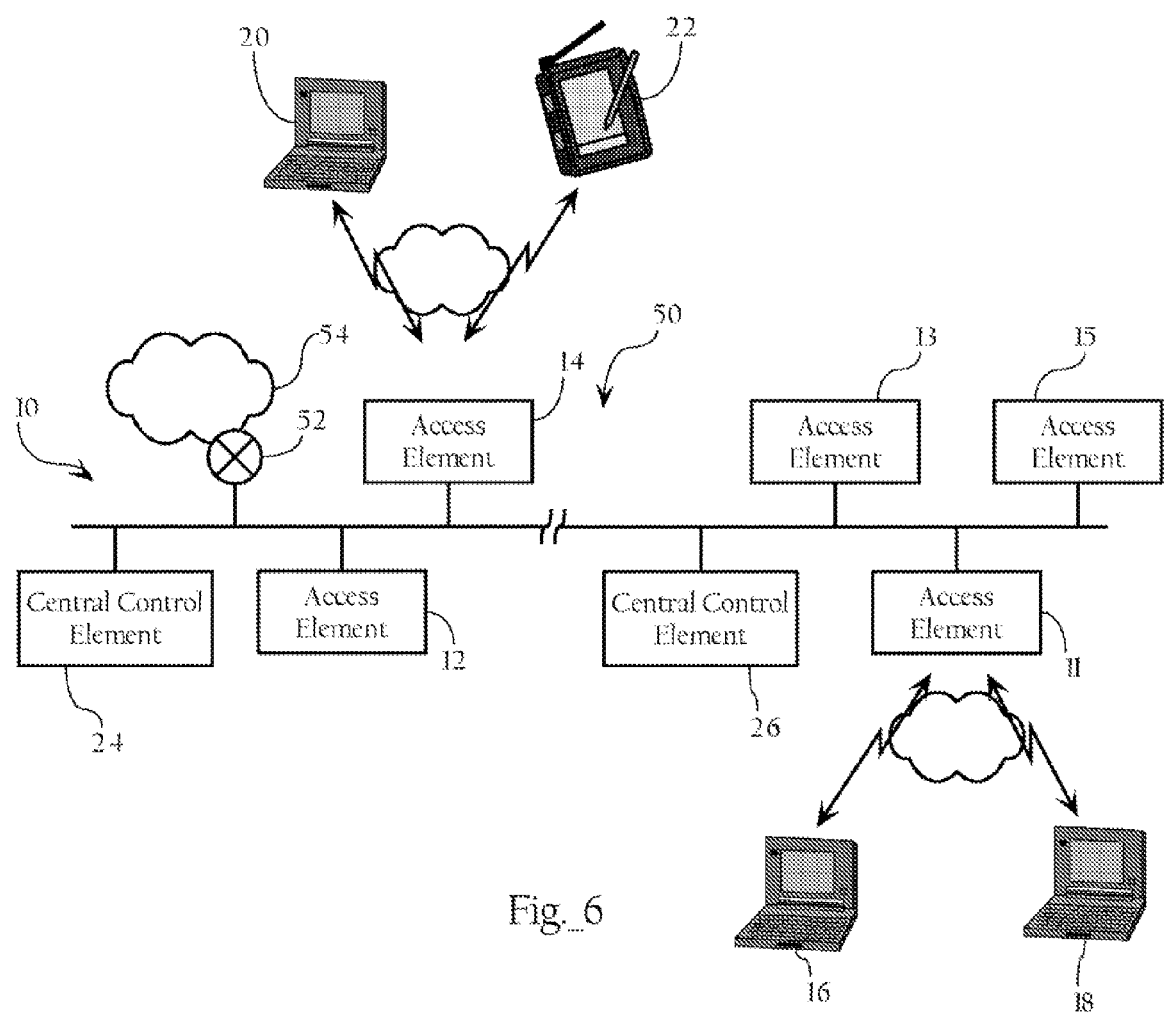
FIG. 6 is a functional block diagram illustrating a wireless network system according to an implementation of the present invention.

In one implementation, the wireless node location functionality discussed above can be integrated into a wireless network infrastructure, such as the hierarchical WLAN system illustrated in FIG. 6. For example, the wireless node location functionality described herein may be integrated into a WLAN environment as disclosed in U.S. application Ser. Nos. 10/155,938 and 10/407,357 incorporated by reference herein. The wireless node location functionality according to the present invention, however, may be applied to other wireless network architectures. For example, the wireless node location functionality may be integrated into a wireless network infrastructure including a plurality of substantially autonomous access points that operate in connection with a central network management system.

Referring to FIG. 6, there is shown a block diagram of a wireless Local Area Network system according to an embodiment of the invention. A specific embodiment of the invention includes the following elements: access elements 11-15 for wireless communication with selected client remote elements 16, 18, 20, 22, central control elements 24, 25, 26, and means for communication between the access elements and the central control elements, such as direct line access, an Ethernet network, such as LAN segment 10. As disclosed in U.S. patent application Ser. No. 10/407,357, the access elements, such as access elements 11-15 are directly connected to LAN segment 10 or a virtual local area network (VLAN) for communication with a corresponding central control element 24, 26. See FIG. 6. As disclosed in U.S. patent application Ser. No. 10/155,938, however, access elements 11-15 may also be directly connected to respective central control elements 24, 26 via direct access lines.

The access elements 11-15 are coupled via communication means using a wireless local area network (WLAN) protocol (e.g., IEEE 802.11a or 802.11b, etc.) to the client remote elements 16, 18, 20, 22. As described in U.S. application Ser. Nos. 10/155,938 and 10/407,357, the access elements 12, 14 and the central control element 24 tunnel network traffic associated with corresponding remote client elements 16, 18; 20, 22 via direct access lines or a LAN segment 10. Central control elements 24, 26 are also operative to bridge the network traffic between the remote client elements 16, 18; 20, 22 transmitted through the tunnel with corresponding access elements 11-15. In another implementation, access elements 11-15 may be configured to bridge the network traffic on LAN segments 10, while sending copies of the bridged frames to the access elements for data gathering and network management purposes.

As described in the above-identified patent applications, central control elements 24, 26 operate to perform data link layer management functions, such as authentication and association on behalf of access element 11-15. For example, the central control elements 24, 26 provide processing to dynamically configure a wireless Local Area Network of a system according to the invention while the access elements 11-15 provide the acknowledgment of communications with the client remote elements 16, 18, 20, 22. The central control elements 24, 26 may for example process the wireless LAN management messages passed on from the client remote elements 16, 18; 20,22 via the access elements 11-15, such as authentication requests and authorization requests, whereas the access elements 11-15 provide immediate acknowledgment of the communication of those messages without conventional processing thereof. Similarly, the central control elements 24, 26 may for example process physical layer information. Still further, the central control elements 24, 26, as discussed more fully below, may for example process information collected at the access elements 11-15 on channel characteristics, signal strength, propagation, and interference or noise.

Figure 7:
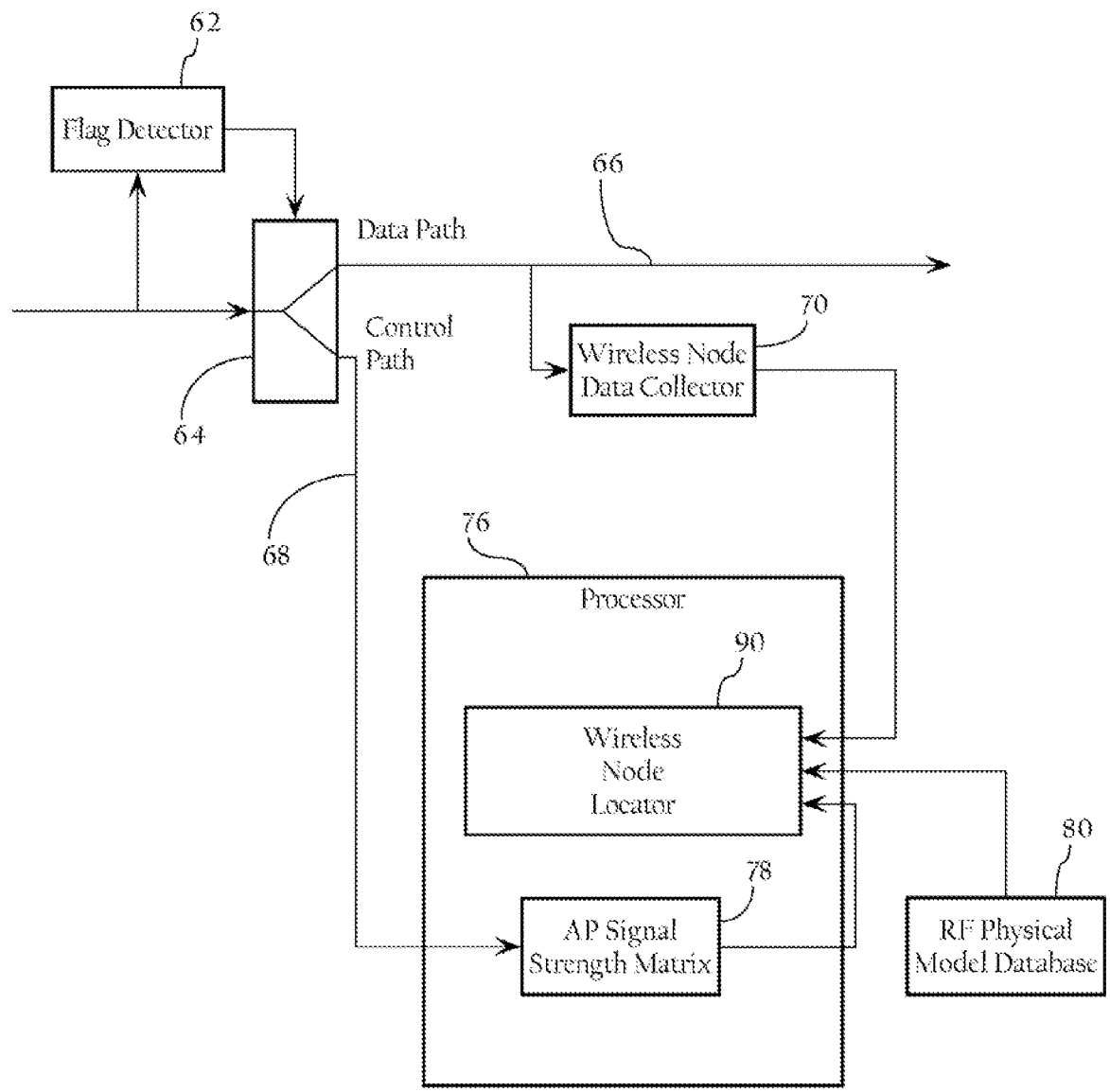
FIG. 7 is a functional block diagram highlighting the wireless node location functionality of a central control element in the wireless network system of FIG. 6.

Central control elements 24, 26, as shown in FIG. 7, may be configured to gather the signal strength data discussed above to support the wireless node location functionality according to the present invention. The signal strength data gathering functionality described herein is quite similar to the data gathering disclosed in U.S. application Ser. No. 10/183,704, incorporated by reference above. In that application, access elements 11-15 append signal strength data to packets received from wireless nodes, typically, in encapsulating headers. The central control elements 24, 26 process the encapsulating packet headers to update various data structures, such as the N×N signal strength matrix and wireless node tables discussed above in Section A. U.S. application Ser. No. 10/183,704 discloses the internal operating components and general configuration of access element 11-15 that can be used in connection with the integrated wireless node location functionality described herein. As discussed above, at least one of the access elements includes two or more directional antennas and control logic that selects one of the antennas to receive wireless frames.

FIG. 7 illustrates the logical configuration of central control elements 24, 26, according to an implementation of the present invention. As discussed in U.S. application Ser. No.

10/183,704, in one implementation, there is both a logical data path 66 and a control path 68 between a central control element 24 or 26 and an access element (e.g., access element 11). The control path 68 allows the central control element 24 or 26 to communicate with the radio access elements 11-15 and acquire the signal strength between the radio access elements. By monitoring the data path 66, the central control element 24, 26 can obtain the signal strength of the signals transmitted by other wireless nodes.

More specifically, the wireless node locator 90 in the central control element 24 or 26 collects information from a plurality of access elements via a control channel 68 and a data channel 66. The central control element 24 or 26 receives and transmits data packets and control packets from/to a plurality of access elements 11-15 as described above. A flag detector 62 distinguishes between data packets and control packets, routing them through a logical switch 64 to a high-speed data path 66 in communication with the wired network 15 or to control path 68 within the central control element 24 or 26. The data path 66 is monitored by a wireless node data collector 70. Associated with each data packet is a resource management header which contains RF physical layer information, such as the power in the channel before each received packet, an identifier for the access element receiving the signal, as well as an identifier for the antenna selected to receive the signal. This information, together with the 802.11 protocol information in the native frames, can be used to maintain one or more data structures that maintain signal strength data for the wireless nodes detected by the access elements 11-15, as discussed in section A, above. The control path 68 is coupled to a processor element 76 in which an AP signal strength matrix 78 is maintained. The AP signal strength matrix 78 collects information quantifying the signal strength between access elements 11-15. All of the signal strength data are collected at the access elements 11-15 and communicated over the data path and control path to the central control element 24 or 26, in one implementation, as packetized information in the resource management header in the data path and resource management control packets in the control path, respectively.

As discussed above, in one implementation, the wireless node location function uses signal strength data between access elements to select a RF physical model that best characterizes the current RF environment. To support such an implementation, one task is to create and maintain a signal strength matrix for all the remote access elements in the various wireless networks which detect each other's signals. This is accomplished, in one implementation, by having the wireless node locator 90 in the central control element 24 or 26 and a Resource Manager in the access elements 11-15 both passively listen to surrounding access elements and actively probe for surrounding access elements. The wireless node locator in the central control element 24 or 26 can schedule an access element 11-15 in the wireless network to transmit a data measurement request on a specified channel and then record responses from surrounding access elements. The data measurement probe request and the receiver information bandwidth can have a narrower information bandwidth than the normal information bandwidth in order to allow the dynamic range of the receiver to be extended beyond its normal operation range. This allows a radio element to "see" access elements beyond its normal operating range. Scheduling these measurements allows multiple measurements to be made with a single transmission and allows the detection of the transmitting signal to be recognized as a change in amplitude relative to the background noise at the scheduled time, allowing for easier detection of the measurement signal and greater dynamic range. The resulting data can be transmitted in control packets collected by AP signal strength matrix 78 on the control path 68. Passively, for each packet received on the data channel at the access element a measurement of the power in the RF channel is made immediately before the received packet. This interference measurement is sent to the central control element via the data channel by appending a Radio Resource Manager header to the data packet. Alternatively, the access elements may be configured to flag packets received from other access elements such that they are transmitted on the control path 68.

FIG. 7 also illustrates an RF physical model database 80 containing the one or more coverage maps for all antennas associated with the access elements 11-15. When activated, the wireless node locator 90 can operate as discussed above to compute the estimated location of a desired wireless node, and return the estimated location the requesting system, such as a network management system or a control interface. In the WLAN system depicted in FIG. 6, several implementations are possible. For example, central control element 24 may be configured as a "master" central control element for purposes of wireless node location. That is, data collected at all central control elements is ultimately transmitted (either regularly or on demand) from other central control elements (e.g., central control element 26) to the master central control element 24 which computes the estimated location. Alternatively, the collected data can be transmitted to a network management system that performs the location computations discussed above. Alternatively, central control elements 24, 26 (when deployed in separate physical spaces, such as separate floors or buildings) may operate substantially autonomously.

The invention has been explained with reference to specific embodiments. For example, although the embodiments described above operate in connection with 802.11 networks, the present invention can be used in connection with any wireless network environment. Furthermore, the radio transceivers can report the detected signal strength information in connection with both antennas and allow the wireless node location functionality decide which antenna or both to use in estimating the location of the wireless node. In addition, although the embodiments described above operate in connection with a RF physical model including a plurality of coverage maps or matrixes, other data structures can be used to store the RF physical model data. Other embodiments will be evident to those of ordinary skill in the art. It is therefore not intended that the invention be limited except as indicated by the appended claims.

What is claimed is:

1. In a wireless node location mechanism comprising a plurality of radio transceivers operative to detect the signal strength of signals transmitted by wireless nodes, a method comprising detecting, at one or more of the plurality of radio transceivers, the signal strength of radio frequency (RF) signals transmitted by a wireless node, wherein at least one of the radio transceivers of the plurality of radio transceivers comprises a plurality of directional antennas, the plurality of directional antennas having substantially non-overlapping patterns relative to each other to achieve sectorization of a region in which the at least one of the radio transceivers is deployed, wherein, for the at least one radio transceiver, peak gains of the plurality of directional antennas are oriented radially and outwardly about an axis and offset relative to each other at an angle substantially equal to 360/N, where N is the number of directional antennas in the plurality of directional antennas;

identifying the directional antennas associated with the detected signal strengths to be used in locating the wireless node;

accessing RF coverage maps corresponding to the plurality of radio transceivers, wherein, as to the at least one radio transceiver comprising a plurality of directional antennas, a unique RF coverage map corresponding to both the radio transceiver and the identified directional antenna is accessed, wherein each of the RF coverage maps is substantially coextensive with antenna patterns of the corresponding antennas of the radio transceivers out to a threshold signal strength level; and computing the estimated location of the wireless node based on the accessed coverage maps and the signal strengths of the RF signals detected by the infrastructure radios, and wherein computing the estimated location of the wireless node is further based on a determined positional overlap between the accessed RF coverage maps associated with the antennas selected to locate the wireless node.

2. The method of claim 1 wherein the coverage maps each comprise a plurality of location coordinates associated with corresponding signal strength values.

3. The method of claim 2 wherein the coverage maps are heuristically constructed.

4. The method of claim 2 wherein the coverage maps based on a mathematical model.

5. The method of claim 1 wherein the computing the estimated location is isolated to the determined positional overlap between the accessed coverage maps associated with the antennas selected to locate the wireless node.

6. An apparatus facilitating the location of a wireless node in a radio frequency (RF) environment, comprising a plurality of radio transceivers comprising at least one antenna, the plurality of radio transceivers operative to detect the strength of signals transmitted by wireless nodes and provide the detected signal strengths to a wireless node location model;

wherein at least one of the radio transceivers comprises at least two directional antennas, the at least two directional antennas having substantially non-overlapping patterns relative to each other to achieve sectorization of a region in which the at least one of the radio transceivers is deployed, and is operative to identify the directional antenna associated with the detected signal strength for a given signal, wherein, for the at least one radio transceiver, peak gains of the plurality of directional antennas are oriented radially and outwardly about an axis and offset relative to each other at an angle substantially equal to 360/N, where N is the number of directional antennas in the plurality of directional antennas;

a data store comprising a plurality of RF coverage maps corresponding to the plurality of radio transceivers, wherein each directional antenna of the plurality of directional antennas has a unique RF coverage map associated therewith, wherein each of the RF coverage maps is substantially coextensive with antenna patterns of the corresponding antennas of the radio transceivers out to a threshold signal strength level;

a wireless node location model operative to access the data store and compute the estimated location of a wireless node based on the RF coverage maps corresponding to the antennas identified by one or more of the radio transceivers, a determined positional overlap between the accessed RF coverage maps associated with the antennas selected to locate the wireless node, and the strength of signals transmitted by the wireless node as detected by a plurality of radio transceivers.

7. The apparatus of claim 6 wherein the RF coverage maps include signal strength values for different locations in a physical region.

8. In a wireless network system comprising a plurality of radio transceivers, wherein the peak gains of the antennas are offset relative to each other, a method comprising detecting, at one of the radio transceivers comprising a plurality of directional antennas, a signal transduced by one of the directional antennas, the plurality of directional antennas having substantially non-overlapping patterns relative to each other to achieve sectorization of a region in which the radio transceiver is deployed, wherein peak gains of the plurality of directional antennas are oriented radially and outwardly about an axis and offset relative to each other at an angle substantially equal to 360/N, where N is the number of directional antennas in the plurality of directional antennas, wherein the signal corresponds to a wireless frame transmitted by a wireless node, the wireless frame including a preamble, and wherein at least some of the plurality of radio transceivers comprise a plurality of directional antennas;

during receipt of the preamble of the frame, selecting one from the plurality of the antennas based on at least one attribute of the respective signals transduced by the antennas;

switching to the selected antenna for receipt of the remainder of the frame;

appending the detected signal strength and an identifier for the selected antenna to the frame; and transmitting the frame to a wireless node location module;

repeating the detecting, selecting, switching, appending and transmitting steps for a desired number of radio transceivers;

accessing a data store using the appended identifiers for the selected antennas to identify a set of coverage maps, wherein the data store comprises a plurality of coverage maps corresponding to the plurality of radio transceivers, wherein each directional antenna of the plurality of directional antennas has a unique coverage map associated therewith, wherein each of the coverage maps is substantially coextensive with antenna patterns of the corresponding antennas of the radio transceivers out to a threshold signal strength level;

computing the estimated location of the wireless node based on the identified set of coverage maps, a determined positional overlap between the accessed coverage maps associated with the antennas selected to locate the wireless node, and the detected signal strengths.

9. A wireless network system facilitating the location of a wireless node, comprising a plurality of radio transceivers for communication with a wireless node location module;

wherein the radio transceivers are each operative to
detect the strength of received signals encoding frames transmitted by wireless nodes;
append a signal strength value to frames received from the wireless nodes; and
transmit received frames to a wireless node location module;

wherein at least one of the radio transceivers comprises a plurality of directional antennas, the plurality of directional antennas having substantially non-overlapping patterns relative to each other to achieve sectorization of a region in which the at least one of the radio transceivers is deployed, wherein, for the at least one radio transceiver, peak gains of the plurality of directional antennas are oriented radially and outwardly about an axis and offset relative to each other at an angle substantially equal to 360/N, where N is the number of directional antennas in the plurality of directional antennas, and wherein the at least one of the radio transceivers is further operative to:
  select one from the plurality of the directional antennas to receive the frames in received signals;
  append an identifier corresponding to the selected antenna to the frames received from the wireless nodes;
a wireless node location module operative to
  store signal strength data appended to frames transmitted by the plurality of radio transceivers in association with wireless node identifiers;
access a data store using the appended identifiers for the selected antennas to identify a set of coverage maps, wherein the data store comprises a plurality of coverage maps corresponding to the plurality of radio transceivers, wherein each directional antenna of the plurality of directional antennas has a unique coverage map associated therewith, and wherein each of the coverage maps is substantially coextensive with antenna patterns of the corresponding antennas of the radio transceivers out to a threshold signal strength level; and compute the estimated location of a wireless node based on the coverage maps associated with the antennas identified by at least one of the radio transceivers, a determined positional overlap between the accessed coverage maps associated with the antennas selected to locate the wireless node, and the signal strength values appended to the frames transmitted by the wireless node as detected by the radio transceivers.

10. The system of claim 9 wherein the frames are 802.11 frames.

11. The system of claim 10 wherein the wireless node identifiers are MAC addresses.

12. In a wireless node location mechanism comprising a plurality of radio transceivers operative to detect the signal strength of signals transmitted by wireless nodes, a method comprising
  receiving, from one or more of the plurality of radio transceivers, the detected signal strength of RF signals transmitted by a wireless node wherein at least one of the radio transceivers of the plurality of radio transceivers comprises a plurality of directional antennas, the plurality of directional antennas having substantially non-overlapping patterns relative to each other to achieve sectorization of a region in which the at least one of the radio transceivers is deployed, and wherein, for the at least one radio transceiver, peak gains of the plurality of directional antennas are oriented radially and outwardly about an axis and offset relative to each other at an angle substantially equal to 360/N, where N is the number of directional antennas in the plurality of directional antennas; accessing a data store to identify a set of coverage maps based on the radio transceivers and the directional antennas used to detect the signal strength of the RF signals, wherein the data store comprises a plurality of coverage maps corresponding to the plurality of radio transceivers, wherein each directional antenna of the plurality of directional antennas has a unique coverage map associated therewith; and
  computing the estimated location of the wireless node using at least some of the signal strengths of the RF signals detected by the infrastructure radios, and the identified set of coverage maps, wherein each of the coverage maps is substantially coextensive with antenna patterns of the corresponding antennas of the radio transceivers out to a threshold signal strength level; and wherein computing the estimated location of the wireless node is isolated to a determined positional overlap between the accessed coverage maps associated with the antennas selected to locate the wireless node.

13. The method of claim 12 wherein the coverage maps each comprise a plurality of location coordinates associated with corresponding signal strength values.

14. The method of claim 13 wherein the coverage maps are heuristically constructed.

15. The method of claim 13 wherein the coverage maps are based on a mathematical model.

16. A wireless node location mechanism operating in association with a wireless network environment comprising a plurality of radio transceivers operative to detect the signal strength of signals transmitted by wireless nodes, comprising:
  a wireless node location module operative to
    receive, from one or more of the plurality of radio transceivers, the detected signal strength of RF signals transmitted by a wireless node wherein at least one of the radio transceivers of the plurality of radio transceivers comprises a plurality of directional antennas, the plurality of directional antennas having substantially non-overlapping patterns relative to each other to achieve sectorization of a region in which the at least one of the radio transceivers is deployed, and wherein, for the at least one radio transceiver, peak gains of the plurality of directional antennas are oriented radially and outwardly about an axis and offset relative to each other at an angle substantially equal to 360/N, where N is the number of directional antennas in the plurality of directional antennas;
    as to the infrastructure radio transceivers comprising a plurality of directional antennas, receive the strength of the RF signals transduced by at least one of the plurality of directional antennas;
    access a data store to identify a set of coverage maps based on the radio transceivers and the directional antennas used to detect the signal strength of the RF signals, wherein the data store comprises a plurality of coverage maps corresponding to the plurality of radio transceivers, wherein each directional antenna of the plurality of directional antennas has a unique coverage map associated therewith, wherein each of the coverage maps is substantially coextensive with antenna patterns of the corresponding antennas of the radio transceivers out to a threshold signal strength level; and
    compute the estimated location of the wireless node using at least some of the signal strengths of the RF signals detected by the infrastructure radios, a determined positional overlap between the accessed coverage maps associated with the antennas selected to locate the wireless node, and the identified set of coverage maps.

* * * * *